United States Patent [19]

Corvazier et al.

[11] Patent Number: 4,691,113
[45] Date of Patent: Sep. 1, 1987

[54] LEVEL INDICATOR FOR A LIQUID IN A CONTAINER

[75] Inventors: Philippe Corvazier, Montigny les Cormailles; Jacques Dousteyssier, Rueil-Malmaison, both of France

[73] Assignee: The British Petroleum Company p.l.c., London, England

[21] Appl. No.: 786,643

[22] Filed: Oct. 11, 1985

[30] Foreign Application Priority Data

Oct. 26, 1984 [FR] France .................. 84 16449

[51] Int. Cl.$^4$ .................. G01N 21/85; G01F 23/00
[52] U.S. Cl. .......................... 250/577; 73/293
[58] Field of Search ............. 250/577; 73/290 R, 293, 73/DIG. 5, DIG. 11; 33/126.6

[56] References Cited

U.S. PATENT DOCUMENTS

| | | | |
|---|---|---|---|
| 4,126,040 | 11/1978 | Varacius et al. | 73/293 |
| 4,200,982 | 5/1980 | Mueller et al. | 33/126.6 |
| 4,242,590 | 12/1980 | von Tluck | 250/577 |
| 4,471,656 | 9/1984 | Sanders et al. | 33/126.6 X |
| 4,598,742 | 7/1986 | Taylor | 250/577 X |

FOREIGN PATENT DOCUMENTS 2151094 4/1973 Fed. Rep. of Germany .
2940865 4/1980 Fed. Rep. of Germany .
2080844 11/1971 France .
2523298 9/1983 France .

Primary Examiner—Eugene R. Laroche
Assistant Examiner—David Mis
Attorney, Agent, or Firm—Morgan & Finnegan

[57] ABSTRACT

Liquid level indicator in a tank of the type having a total-reflection optical sensor (1). The sensor is mobile vertically, so as to be able to be immersed or partially immersed in relation to the liquid level. The optical sensor (1) has an integrated light transmitter (DE) and receiver (PR) and is suspended by a non-extensible cable (5) wound onto an upper drum (6), the drum being driven upwards or downwards by a stepping motor (9) relative to the liquid level. The sensor (1) is connected with a wire (10) through a pully (13) ballasted with a weight (14) and fastened at its upper end so as to provide both the mechanical tension of the cable (5) and the electrical connection of the mobile sensor (1). The indicator also comprises a magnetic sensor (16) co-operating with a magnet (17), one of these two units being fixed in the top position and the others being mobile with the cable (5), so as to detect the arrival of the sensor (1) at a given higher level or maximum liquid level.

6 Claims, 4 Drawing Figures

LEVEL INDICATOR FOR A LIQUID IN A CONTAINER

BACKGROUND OF THE INVENTION

The invention relates to the indication of the level of a liquid in a container by the use of a total-reflection refractive optical device, whose properties of transmitting a light ray are modified when the surface of reflection is wetted by the liquid.

The detection of one or more fixed levels using one or more fixed prisms or cones combined with fibre optics, is known, in particular according to French Pat. No. 2,213,487. Such a device provides information only at the instant when a given level is reached but gives no exact indication of the level in other circumstances.

A device with an optical prism integrated with the light transmitter and receiver and which allows remote operation by means of electrical wires rather than fibre optics, is also known, from British Pat. No. 888,941. However, here again the prisms are always in a fixed position, with the same drawbacks as above.

Also a level indicator device which, in one particular form, makes use of prisms which are able to move vertically by means of a screw, but in which the light transmitter and receiver are always fixed with remote transmission of the light, is also known, in particular according to French Pat. No. 1,593,760. The optical, electronic and mechanical assembly is then complex and delicate.

SUMMARY OF THE INVENTION

The object of the present invention is to provide a level indicator device by optical means of the above type, but which is accurate, reliable and simple, both in design and fitting, and which furthermore will satisfy the safety conditions imposed for petroleum products or the like.

Thus according to the present invention there is provided a liquid level indicator comprising a totally internally reflecting optical sensor having a light emitter and receiver, means for moving the optical sensor upwardly and downwardly relative to the liquid level so as to allow the optical sensor to be totally or partially immersed in the liquid, the optical sensor communicating with means for indicating the liquid level, and means for indicating the maximum liquid level.

The invention also includes a method for measuring the liquid level in a container by menas of a liquid level indicator as herein above described in which (a) in a setting phase, the rotation of the stepping motor is controlled in the direction of ascent until the logic state corresponding to the arrival of the sensor at the high level is detected, the motor then being stopped and a high level value determined experimentally and contained in a memory is transferred to a reversible counter; (b) in a utilisation phase, operating in successive measuring cycles, during each of which the rotation of the stepping motor is controlled in the direction of descent at a slow speed until the logic state corresponding to the commencement of immersion of the optical sensor is detected, the contents of the reversible counter are then transferred into a display memory representing the measurement sought, then the stepping motor rotation is controlled in the direction of re-ascent at a rapid speed and for a given number of steps so that the otpical sensor reaches a certain distance above the liquid level, after which the motor is stopped until the next cycle; and (c) in a filling phase, the rotation of the stepping motor is controlled in the direction of high-speed re-ascent each time the logic state corresponding to a commencement of immersion of the sensor is detected, and at least until the logic state corresponding to immersion is detected, the reversible counter in all cases being incremented and decremented synchronously with the steps of ascent and descent respectively of the motor.

BRIEF DESCRIPTION OF THE DRAWINGS

The invention will now be described by way of example only and with reference to FIGS. 1 to 4 of the accompanying drawings.

DESCRIPTION OF THE PREFERRED EMBODIMENTS

Figures 1, 2:
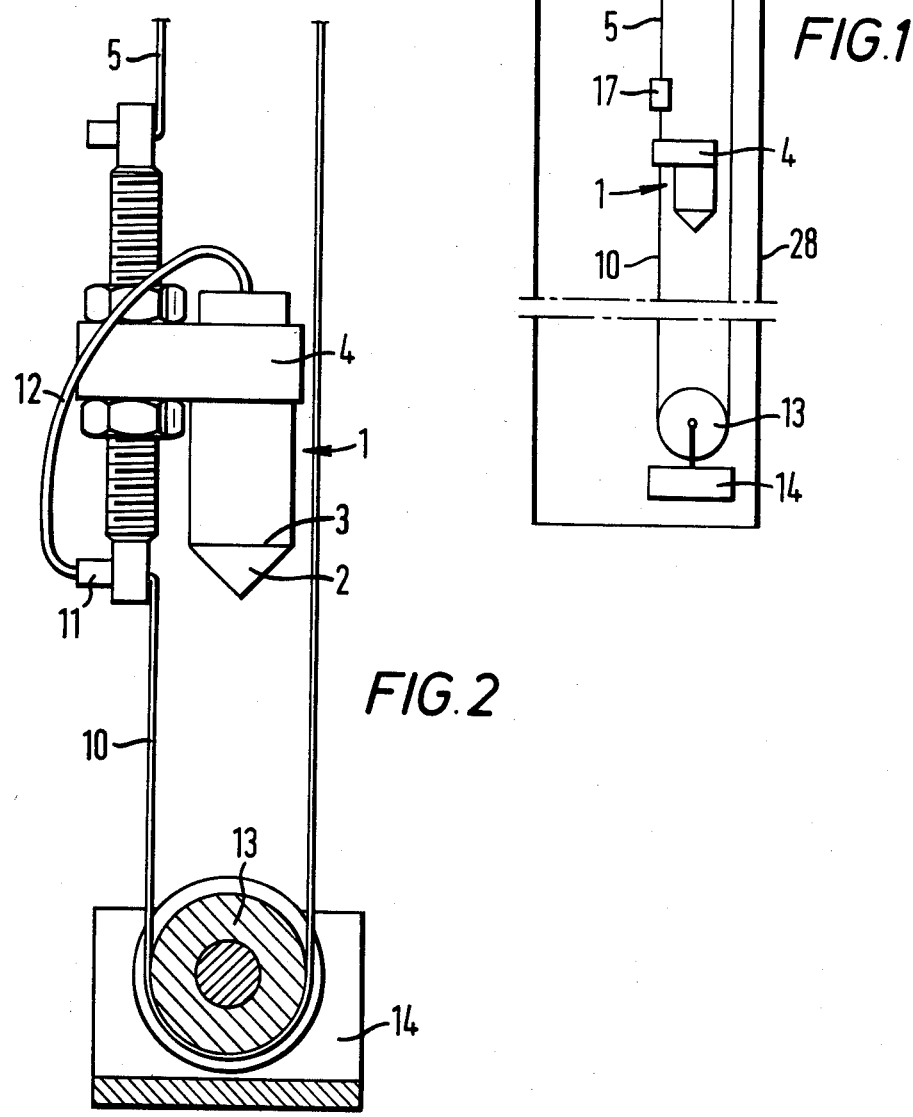
FIG. 1 shows a view in elevation of the mechanical diagram of the level indicator.
FIG. 2 shows a detailed view of the operation of the sensor and counterweight.

As can be seen from FIGS. 1 and 2, the apparatus comprises an optical sensor having a cone 2 of refractive material oriented with its apex downwards, and the horizontal upper face 3 or which comprises, side by side, an electroluminescent diode (DE) and a photoresistance (PR). When the cone is partially immersed in a liquid, the total internal reflections lose their intensity and the resistance of the photoresistance (PR) abruptly increases, the change of resistance being detected remotely.

The optical sensor is mounted on a mobile support 4 suspended on the end of a cable 5 of non-extensible material, for example a cable 0.6 mm in diameter in stainless steel. The upper part of this cable 5 is wound round a drum 6 which has a helical groove to enable good winding of the cable and has a fixing point 7 for the corresponding end of the cable. This drum is mounted on bearings (not shown) and driven via a coupling 8 from a stepping motor 9. The diameter of the drum 6 and the number of pulses per revolution of the motor 9 are chosen so as to have the desired accuracy (fraction of an mm).

A cable or wire 10 with several conductors is attached to the lower end of the support 4 by a cable clamp 11, the surplus strand 12 of this wire being electrically connected to the sensor 1, whilst the lower strand passes into a mobile-groove pulley 13, which is integral with a counterweight 14. The wire passes vertically upwards as far as the drum, where it is mechanically fixed to resist the tension of the weight and electrically connected to a detector 15.

The wire 10 and the weight 14 thus give the necessary tension for the cable 5 to provide good winding on the drum 6, and also the electrical connection of the elements of the mobile sensor with the fixed part, whilst avoiding any inadvertent formation of loops in the cable.

Figure 3:
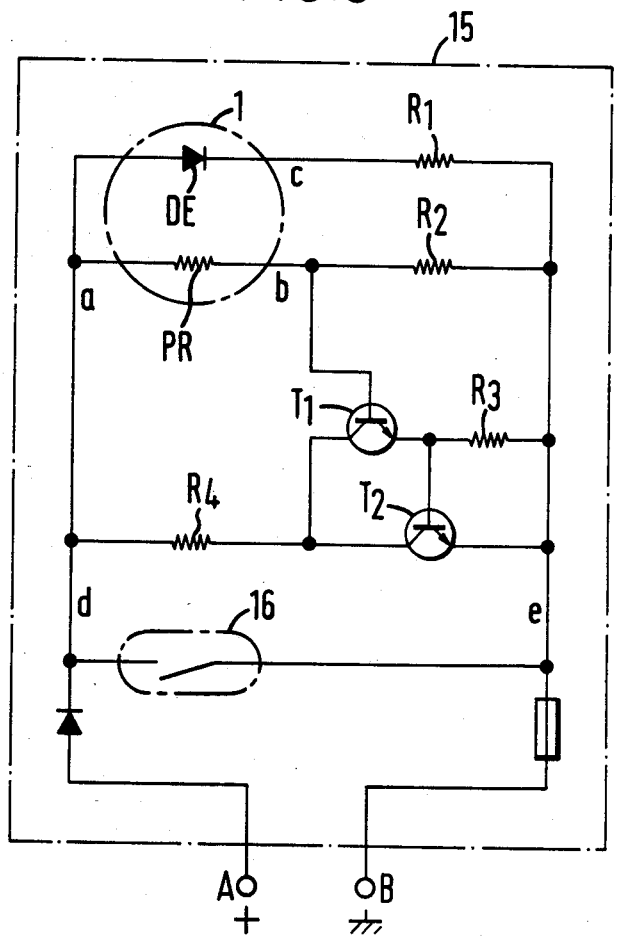
FIG. 3 shows the electronic circuitry of the detector.
Figure 4:
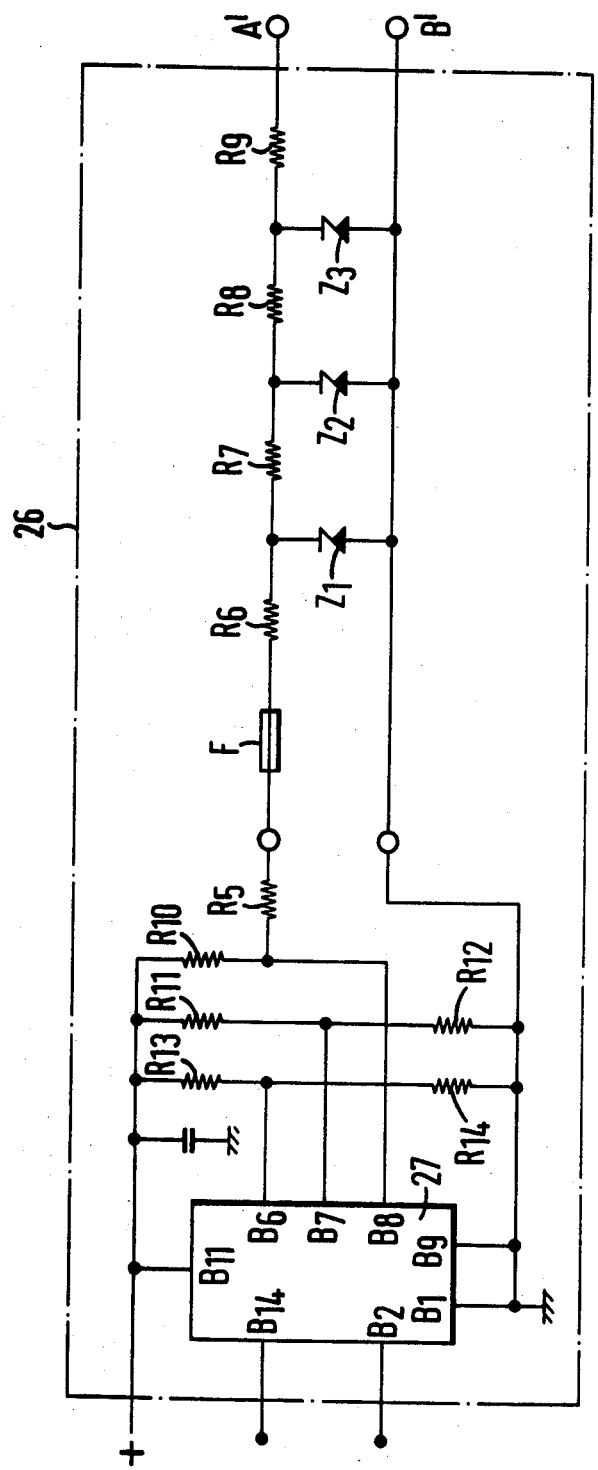
FIG. 4 shows the electronic circuitry of the remotely located receiver.

The device also comprises a magnetic sensor or pick up 16 co-operating with a small magnet 17 to detect the arrival at the top position or maximum liquid level of the sensor 1 and its support 4. In the example shown, the sensor 16 comprises a magnetic reed relay located in a fixed position and connected by a wire 18 to the detector 15, whereas the magnet 17 is fixed on the support 4 or the cable 5 above the support 4. The electrical connection is shown in FIG. 3. In this case, the wire 10 comprises three conductors corresponding to wires a, b and c respectively in FIG. 3. But it is also possible to integrate the whole of the top part of the detector 15 with the sensor 1, so as just to have two connecting wires, shown by wires d and e in FIG. 3, and even likewise to integrate the magnetic sensor 16 with this sensor 1, so as still only to have two connecting wires, corresponding to terminals A and B on FIG. 3. In this latter case, that is to say if it is the magnetic sensor 16 which is mobile, it is the magnet 17 which is located in a fixed place, and the upper end of the wire 10 is then connected directly to the terminal box 19.

The stepping motor 9 is of a comparatively powerful type and gives several hundred pulses per revolution. It is enclosed in an explosion-proof casing 20, shown diagrammatically in FIG. 1, with an explosion-proof outlet 21 for the shaft 22 driving the drum 6, and a connection terminal box with stuffing box 23 for the linking cable 24 which is of the simple or explosion-proof hermetic type. The rest of the device may be located in an ordinary casing 25 with a non-hermetic terminal box 19.

The detector 15, whether located in the casing 25 or the sensor 1, comprises the minimum of electronics to facilitate fitting and maintenance in places which may be cramped and difficult of access. The detector 15 comprises several circuits in parallel between its terminals A and B; a resistance R1 in series with DE, a resistance R2 in series with PR, a resistance R4 in series with a Darlington assembly T1, T2, and R3, controlled by the voltage at b, and finally the magnetic detector 16. The detector 15 is connected by a double line (not shown) to the receiver of the level indicator proper located remotely, and the resistances R1 to R4 are determined so that, bearing in mind the resistance of this line and the receiver located at the other end, the following values occur in the line, depending on the cases:

When the detector 1 is immersed and is not in the high position, PR is at its maximum value, the transistors T1 and T2 are blocked and 16 is open. This is the minimum current case, and R1 is determined so that this minimum current is 5 mA. For example, R1 has a value of 1500 ohms for a 12-volt supply.

When the detector 1 is not immersed and is not in the top position, PR is illuminated and assumes its minimum value. Transistors T1 and T2 thus become conductors, and to the previous current there is added the current passing via R4 and T2. The resistances R2, R3 and R4 are determined so that under these conditions the current is 15 mA. For example, R2=100,000 Ohms, R3=1,800 Ohms and R4=240 Ohms.

Finally, when the optical sensor 1 is in the top position, whether immersed or not, the magnetic sensor 16 is closed and one has a current of 25 mA in the line.

In this way, with only two junction wires, the three states necessary for the determination of the level can be measured. For this purpose, at the other end of the junction line, a receiver 26 is located whose input terminals A' and B' are connected by this line to the terminals A and B of the detector 15.

This receiver 26 comprises firstly an assembly of resistances in series R5, R6, R7, R8 and R9 and Zener diodes in parallel Z1, Z2 and Z3, with in addition a fuse F to provide an inherent safety barrier.

Next, this receiver 26 comprises a detector with two thresholds and three states consisting of an integrated circuit 27 which detects thresholds receiving at an input B8 the measuring signal determined by a measuring resistance R10 of a precise value, and receiving at another input B7 a low reference voltage defined by a potentiometric connection with two resistances R11 and R12, and at a third input B6 a high reference voltage determined by another potentiometric connectio n ith two resistances R13, R14.

The resistances R11 and R14 are determined for example so that the low reference voltage at B7 is 6 volts and the high reference voltage at B6 is 9 volts, and the resistance R10 is determined so that for the three currents indicated above of 5, 15 and 25 mA respectively, the voltage at B8 is 10.5 volts; 7.5 volts and 4.5 volts respectively.

In this way the two outputs B2 and B14 assume respectively logic states which provide information on which of the three cases envisaged is present:

States 1 and 0 correspond to the first case, sensor immersed,

States 1 and 1 correspond to the second case, sensor not immersed, and

States 0 and 1 correspond to the third case, sensor at high level.

These two logic outputs are then picked up by a microprocessing device which increases and decreases a digital reversible counter by increments or decrements of one unit respectively for each pulse of the motor 9 in the direction of ascent and descent, and which applies the following measuring procedure.

In a regulating phase, which of necessity occurs when the device is initialised, (but which may be repeated each time it appears necessary [re-timing]) the stepping motor is controlled in the direction of the ascent until the third logic state is detected, that is to say the high level corresponding to the closure of the magnetic sensor 16. This closure then has two effects, one being a safety effect preventing any further rotation of the stepping motor 9 in the direction of ascent, and the other the initialisation of the digital reversible counter of the level indicator to a value determined experimentally and stored in the memory.

In a second phase of utilisation of the tank, the liquid level of which is therefore stable or going down slowly, one operates by successive measuring cycles regularly spaced out in time, and for each cycle the stepping motor 9 is controlled in the direction of descent and at slow speed, at the rate of one pulse per second, as long as one is in the second logic state, that is to say with the sensor 1 not immersed. For each pulse of the motor 9, one unit is naturally counted down in the counter of the level indicator. When the logic state corresponding to the immersed sensor is detected, the rotation of the motor 9 is stopped, the contents of the digital counter are noted in a read-out memory, then the rotation of the motor 9 is brought about in the direction of ascent and at rapid speed, of about 1 cm/second, for a given number of pulses corresponding to a re-ascent of the sensor 1 sufficient for it still to be in the period of rest above the liquid level.

Still in this second phase of utilisation, the content of the reversible counter is continually compared with a low-level memory initially loaded in order to trigger an alarm if the level drops below the value of this low level.

Finally, in a third phase of filling of the tank, the rotation of the motor 9 is actuated continuously, no longer by successive cycles but throughout the entire duration of the filling, in the direction of ascent at rapid speed (1 cm/second) each time the immersed state of the sensor 1 has been detected. The sensor 1 therefore speeds upwards constantly avoiding contact with the liquid and if necessary triggers a loud alarm when the logid state corresponding to the high level is reached.

Naturally, the processing device connected to the outputs B2 and B14 and making up the level indicator proper may be associated with several detection devices corresponding to several tanks by carrying out a sequential scan of these tanks and alternating the measuring cycles. Furthermore, this processing device may comrpise all the desired peripherals for exploiting these data, including display, alarm, data processing, for example for the correction calculations, or again a printer to print out the results or a remote link-up by modem.

The installation assembly, especially the assembly proper to each tank, is relatively simple, compact and easy to install, the two casing 20 and 25 being combined at the upper end of a damping tube 28 which contains the mobile assembly and which is connected hermetically to the top of the tank by a passage of reduced diameter. Furthermore, the measurement is accurate, reliable and particularly well adapted to data processing, whilst having good safety characteristics.

We claim:

1. Liquid level indicator comprising (a) totally internally reflecting optical sensor having a light emitter and receiver arranged so that when the optical sensor is in contact with the liquid the total internal reflections of the light from the light emitter to the receiver are reduced, (b) means for moving the optical sensor upwardly or downwardly relative to theliquid level so as to allow the optical sensor to be brought into contact with the liquid, (c) the optical sensor having means for indicating the maximum liquid level, (d) means for signaling the position of the optical sensor with respect to the liquid level and the maximum liquid level comprising a unit providing distinct signals for three logic states corresponding to the sensor in contact with the liquid and not at maximum liquid level, the sensor not in contact with the liquid and not at maximum liquid level, and the sensor at maximum liquid level whether in contact with the liquid or not, and (e) said means for signaling the position of the optical sensor being adapted to actuate said means of moving the optical sensor so as to cause the sensor to sense the liquid level.

2. Liquid level indicator according to claim 7 in which the means for moving the optical sensor upwardly or downwardly relative to the liquid level comprises a driven drum having an inextensible cable supporting the optical sensor, the drum being driven by a motor.

3. Liquid level indicator according to claim 2 in which the inextensible cable is in electrical communication with the optical sensor and the means for indicating the position of the optical sensor.

4. Liquid level indicator according to claim 1 in which the means for indicating the maximum liquid level comprises a magnet or magnetic pick-up asociated with the optical sensor cooperating with a magnetic pick-up or magnet located at the maximum level.

5. Method for measuring liquid level in a vessel by means of the level indicator according to any of the preceding claims in which (a) in a setting phase the means for moving the optical sensor is controlled in the direction of ascent until the logic state corresponding to the arrival of the sensor at the maximum liquid level is detected, the means for moving the optical sensor then being stopped and a high level value determined experimentally and contained in a memory is transferred to a reversible counter; (b) in a utilization phase operating in successive measuring cycles, during each of which the means for moving the optical sensor is controlled in the direction of descent at a slow speed until the logic state corresponding to the commencement of immersion of the optical sensor is detected, the contents of the reversible counter are then transferred into a display memory representing the measurement sought, then the means for moving the optical sensor is controlled in the direction of re-ascent at a rapid speed so that the optical sensor reaches a certain distance above the liquid level, after which the means for moving the optical sensor is stopped until the next cycle; and (c) in a filling phase, the means for moving the optical sensor is controlled in the direction of high-speed re-ascent each time the logic state corresponding to the commencement of immersion of the sensor is detected, the reversible counted in all cases being incremented and decremented synchronously with the ascent and descent respectively of the optical sensor.

6. Method according to claim 5 in which the level indicator is associated with optical sensors in more than one vessel so as to allow scanning and monitoring of the liquid level in each vessel.

* * * * *

UNITED STATES PATENT AND TRADEMARK OFFICE
CERTIFICATE OF CORRECTION

PATENT NO. : 4,691,113

DATED : September 1, 1987

INVENTOR(S) : Philippe Corvazier et al

It is certified that error appears in the above-identified patent and that said Letters Patent is hereby corrected as shown below:

Column 1, line 49 "menas" should read --means--.
Column 1, line 67 "otpical" should read --optical--.
Column 3, line 26 "non-hermetric" should read --non-hermetic--.
Column 4, line 9 "connectio n" should read --connection--.
Claim 1, line 38 "theliquid" should read --the liquid--.
Claim 4, line 15 "asociated" should read --associated--.

Signed and Sealed this

Twenty-third Day of February, 1988

Attest:

DONALD J. QUIGG

*Attesting Officer*     *Commissioner of Patents and Trademarks*